(12) United States Patent
Miyamoto et al.

(10) Patent No.: US 11,218,108 B2
(45) Date of Patent: Jan. 4, 2022

(54) MOTOR CONTROLLER

(71) Applicant: AISIN SEIKI KABUSHIKI KAISHA, Kariya (JP)

(72) Inventors: Hiroyuki Miyamoto, Kariya (JP); Kenji Yamashita, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 0 days.

(21) Appl. No.: 16/905,428

(22) Filed: Jun. 18, 2020

(65) Prior Publication Data
US 2020/0403550 A1 Dec. 24, 2020

(30) Foreign Application Priority Data
Jun. 21, 2019 (JP) .............................. JP2019-115058

(51) Int. Cl.
| | | |
|---|---|---|
| H02P 6/14 | (2016.01) | |
| H02P 27/08 | (2006.01) | |
| F04B 49/20 | (2006.01) | |
| H02P 27/04 | (2016.01) | |

(52) U.S. Cl.
CPC ............ *H02P 27/085* (2013.01); *F04B 49/20* (2013.01); *H02P 27/045* (2013.01)

(58) Field of Classification Search
CPC ........ H02P 27/085; H02P 27/045; H02P 6/14; F04B 49/20
See application file for complete search history.

(56) References Cited

U.S. PATENT DOCUMENTS

2010/0283416 A1 11/2010 Onishi et al.
2014/0084824 A1* 3/2014 Hano .................. H02P 6/14
                                                          318/400.09

FOREIGN PATENT DOCUMENTS

| JP | 08-126381 A | 5/1996 |
|----|-------------|--------|
| JP | 2007-519384 A | 7/2007 |
| JP | 2017-184426 A | 10/2017 |
| WO | 2009/110206 A1 | 9/2009 |

* cited by examiner

*Primary Examiner* — Cortez M Cook
(74) *Attorney, Agent, or Firm* — Sughrue Mion, PLLC

(57) ABSTRACT

A motor controller includes: a rotation speed measurement portion that measures a rotation speed of a motor; and an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value.

6 Claims, 3 Drawing Sheets

MOTOR CONTROLLER

CROSS REFERENCE TO RELATED APPLICATIONS

This application is based on and claims priority under 35 U.S.C. § 119 to Japanese Patent Application 2019-115058, filed on Jun. 21, 2019, the entire content of which is incorporated herein by reference.

TECHNICAL FIELD

This disclosure relates to a motor controller.

BACKGROUND DISCUSSION

In related art, there is known a motor controller that switches an energization method of a motor (see, for example, International Publication No. 2009/110206).

International Publication No. 2009/110206 described above discloses a brushless motor device (motor controller) that switches the drive of a three-phase brushless motor between a 120-degree energization method and a 180-degree energization method. In the brushless motor device, parameters relating to a rotation speed of the brushless motor are calculated. When the calculated parameter exceeds a predetermined threshold value, the drive of the brushless motor is switched from the 120-degree energization method to the 180-degree energization method.

Generally, the 120-degree energization method can easily generate a drive waveform for driving a brushless motor. Further, the rotation speed in the 120-degree energization method is relatively stable, and the risk of step-out is low. On the other hand, the 180-degree energization method is superior to the 120-degree energization method in quietness and vibration. Accordingly, in International Publication No. 2009/110206 described above, it is possible to reduce the risk of step-out in a state where the rotation speed is relatively low, and to improve quietness and vibration characteristics in a state where the rotation speed is relatively high. However, in the 180-degree energization method, since it is necessary to generate a drive waveform having a sine wave shape according to the position (rotation position) of the rotor, it is always necessary to accurately measure the rotation speed of the rotor and the position of the rotor. That is, as compared with the 120-degree energization method, the 180-degree energization method complicates control of the brushless motor device. Further, to accurately measure the rotation speed of the rotor and the position of the rotor, an amplifier that amplifies the current is required. That is, the 180-degree energization method has a more complicated configuration of the brushless motor device than the 120-degree energization method. Accordingly, the brushless motor device (motor controller) of International Publication No. 2009/110206 has a problem that control and configuration are complicated.

A need thus exists for a motor controller which is not susceptible to the drawback mentioned above.

SUMMARY

A motor controller according to one aspect of the present disclosure includes a rotation speed measurement portion that measures a rotation speed of a motor; and an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described below with reference to the drawings.

Present Embodiment

A configuration of a motor controller 100 according to the present embodiment will be described with reference to FIGS. 1 to 4.

Figure 1:
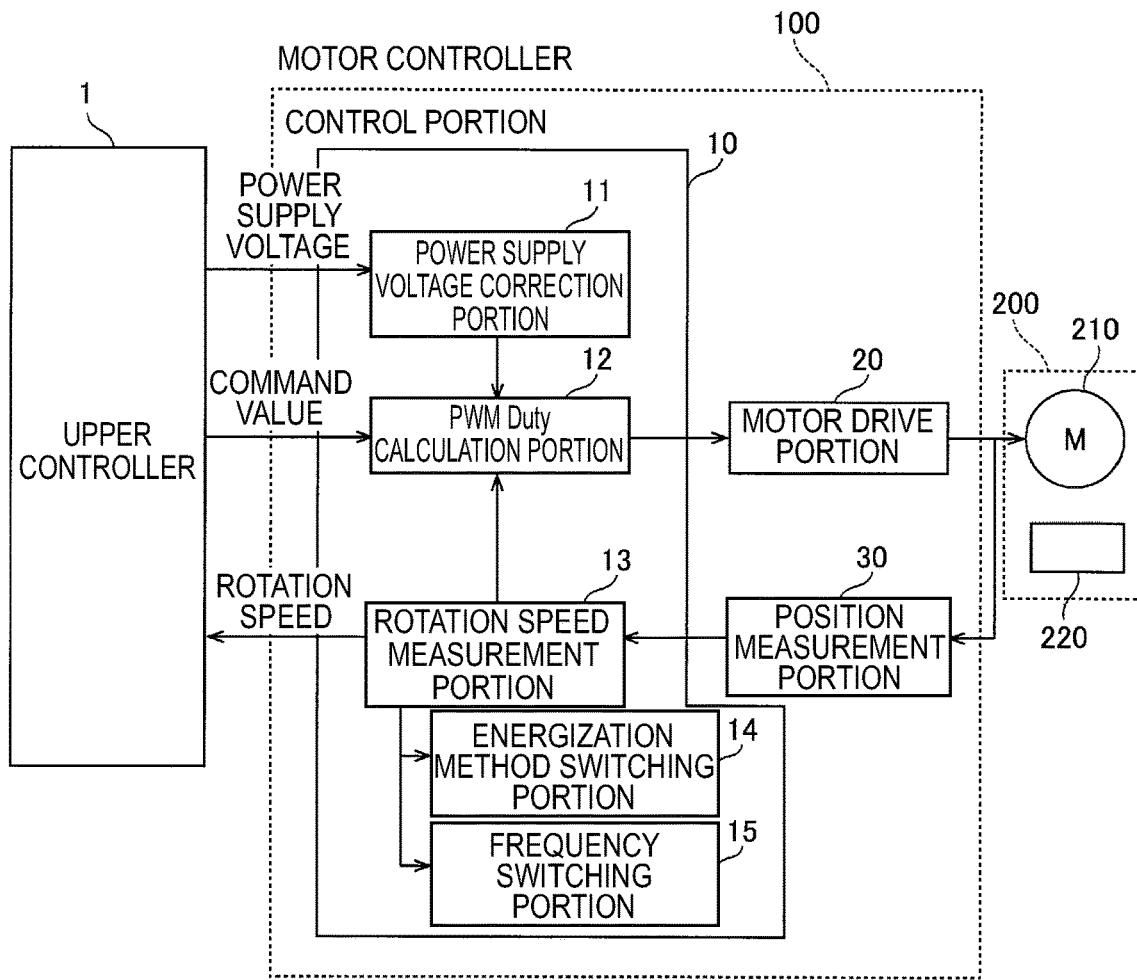
FIG. 1 is a block diagram illustrating a configuration of a motor controller according to an embodiment disclosed here.

As illustrated in FIG. 1, the motor controller 100 is configured to control the drive of an electric water pump 200. Further, the electric water pump 200 is mounted in, for example, a vehicle (automobile). Further, the electric water pump 200 includes a motor 210 and a pump portion 220.

Further, the motor 210 is a sensorless brushless motor. That is, the motor 210 is a motor that does not have a brush and a commutator. Further, the motor 210 has a rotor provided with a permanent magnet and a stator provided with a coil. The rotation position of the rotor is measured, and the current supplied to the coil is switched according to the rotation of the motor (position of the rotor).

Further, the motor 210 does not have a sensor that measures the rotation of the motor (position of the rotor). In the motor 210, the position of the rotor is specified based on the waveform of the electromotive force (induced voltage) generated by the rotation of the rotor.

An input signal (command value or the like) from an upper controller 1 is input to the motor controller 100. The upper controller 1 is constituted with, for example, an engine control unit (ECU). The ECU is a computer for electronically controlling the vehicle. Further, the motor controller 100 is constituted with a microcomputer or the like.

The motor controller 100 includes a power supply voltage correction portion 11. The power supply voltage correction portion 11 corrects the power supply voltage input from the upper controller 1. Further, the corrected power supply voltage is input to a PWM duty calculation portion 12.

The motor controller 100 includes the PWM duty calculation portion 12. The PWM duty calculation portion 12 calculates a signal for controlling a motor drive portion 20 based on the command value input from the upper controller 1, the corrected power supply voltage input from the power supply voltage correction portion 11, and a rotation speed of the motor 210 input from a rotation speed measurement portion 13.

Figure 2:
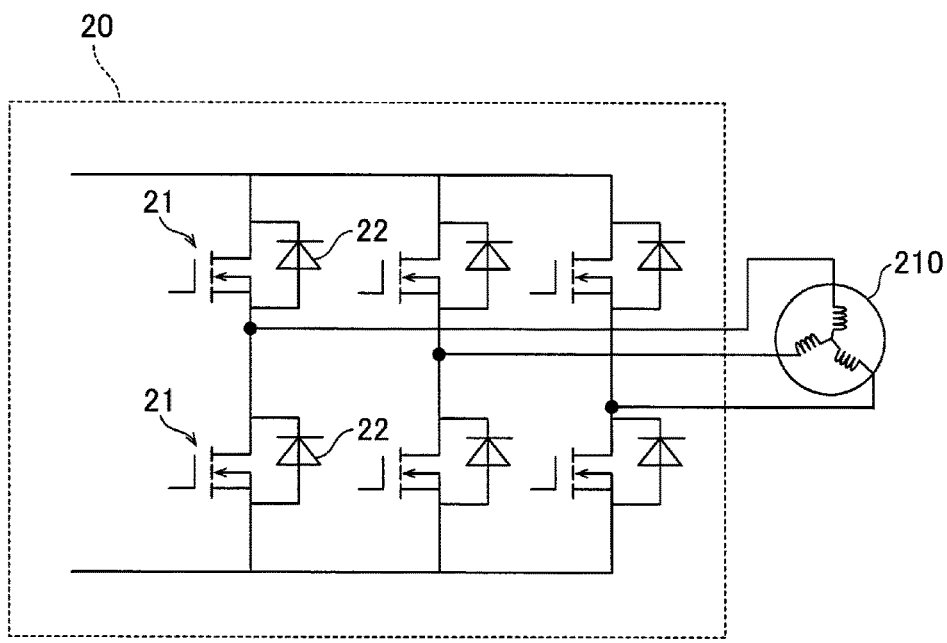
FIG. 2 is a circuit diagram of a motor drive portion according to the embodiment disclosed here.

The motor controller 100 includes a motor drive portion 20 (inverter circuit). As illustrated in FIG. 2, the motor drive portion 20 includes six switching elements 21.

As illustrated in FIG. 1, the motor controller 100 includes a position measurement portion 30. The position measurement portion 30 measures the position of the motor 210 based on the induced voltage generated by the rotation of the motor 210 (rotor).

The motor controller 100 includes the rotation speed measurement portion 13. The rotation speed measurement portion 13 measures (calculates) the rotation speed of the motor 210 (rotor) based on the position of the motor 210 measured by the position measurement portion 30.

Next, the 120-degree energization method and the 150-degree energization method will be described.

Figure 3:
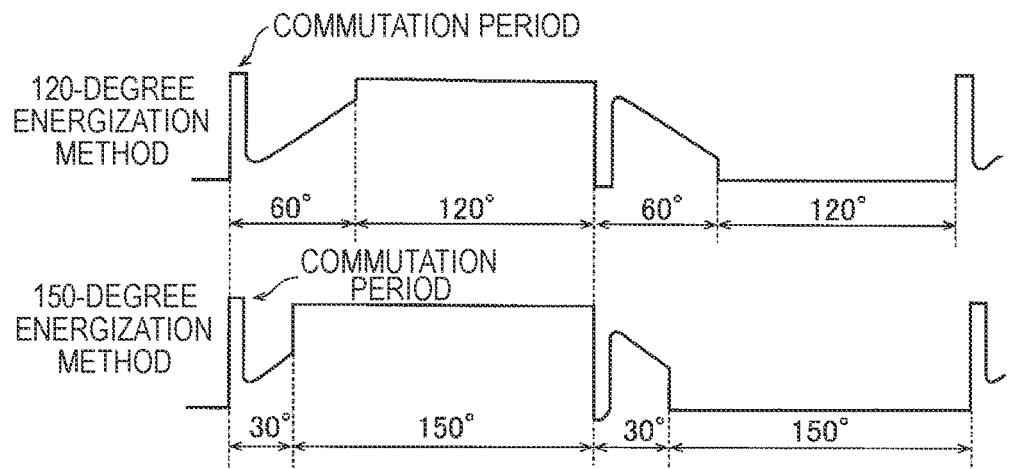
FIG. 3 is a diagram illustrating waveforms of PWM signals of a 120-degree energization method and a 150-degree energization method.

As illustrated in FIG. 3, in the 120-degree energization method, among the six switching elements 21 (see FIG. 2) of the motor drive portion 20, the upper arm of one phase (for example, U phase) is turned on for a period of 120 degrees, the lower arm of the other one phase (for example, V phase) is turned on for a period of 120 degrees, and the remaining switching elements 21 (for example, the lower arm of the U phase, the upper arm of the V phase, and the upper and lower arms of W phase) are turned off. Accordingly, in the 120-degree energization method, energization to the coil is maintained for a period of 120 degrees in each phase, and energization to the coil is not performed for a period of 60 degrees. Further, in the 150-degree energization method, the switching element 21 is turned on for a period of 150 degrees, so that in each phase, energization to the coil is maintained for a period of 150 degrees, and energization to the coil is not performed for a period of 30 degrees.

Further, in the 120-degree energization method (150-degree energization method), a voltage is generated at the terminal of each phase even during the period in which the energization is not performed. For example, current flows through the coil of the V phase and the coil of the W phase even during the period in which energization to the coil of the U-phase is not performed. Accordingly, an induced voltage is generated at the terminal of the U phase even during the period in which energization to the coil of the U-phase is not performed. In the motor 210 (sensorless motor), the position information of the motor 210 is acquired based on the zero-cross point of the induced voltage generated at the terminal of the phase (U phase in the above example) in which energization is not performed. Based on the acquired position information of the motor 210, the phase of the coil through which the current is passed (energized) is switched. Further, there are six zero-cross points for each phase for one rotation of the motor 210. That is, the position information of the motor 210 is acquired for every 60 degrees. Accordingly, unlike the 180-degree energization method, the position information of the motor 210 is not always acquired.

The commutation period in FIG. 3 is a period in which a return current flows through a diode 22 (see FIG. 2) of the switching element 21 until the energy stored in the coil after being energized for a period of 120 degrees (150 degrees) disappears.

Further, PWM control is performed in the 120-degree energization method (150-degree energization method). In the PWM control, the power output from the motor drive portion 20 is controlled by repeating ON and OFF of the switching element 21. Further, the ON/OFF cycle (frequency) of the switching element 21 is configured to be adjustable.

Here, in the present embodiment, as illustrated in FIG. 1, the motor controller 100 includes an energization method switching portion 14. The energization method switching portion 14 drives the motor 210 by the 120-degree energization method when the rotation speed of the motor 210 measured by the rotation speed measurement portion 13 is less than or equal to a predetermined threshold value. Further, the energization method switching portion 14 switches the energization method so that the motor 210 is driven by the 150-degree energization method when the rotation speed of the motor 210 measured by the rotation speed measurement portion 13 exceeds a predetermined threshold value.

Further, in the present embodiment, a plurality of predetermined threshold values are provided in a selectable manner and are selected in advance before the control of the motor 210 is started. Specifically, the predetermined threshold value is selected in advance when the motor controller 100 is shipped. For example, four (N1, N2, N3, and N4) predetermined threshold values are provided in a selectable manner (incorporated) in advance in the motor controller 100. When the motor controller 100 is shipped, one threshold value is selected from the four predetermined threshold values. The selected threshold value is written in the one-time memory provided in the motor controller 100. That is, the threshold value selected once cannot be changed. Further, as the predetermined threshold value, an optimum threshold value is selected based on the use of the motor 210 (a type of the motor 210, magnetic flux amount, or the like).

Further, in the present embodiment, the predetermined threshold value is set such that the threshold value when the rotation speed of the motor 210 measured by the rotation speed measurement portion 13 changes from a low rotation speed to a high rotation speed, is different from the threshold value when the rotation speed of the motor 210 changes from a high rotation speed to a low rotation speed. In other words, the predetermined threshold value has a hysteresis characteristic. For example, it is assumed that the threshold value N1 is selected from the four threshold values provided in a selectable manner. The threshold value N1 includes a threshold value N1a when the rotation speed of the motor 210 changes from a low rotation speed to a high rotation speed and a threshold value N1b when the rotation speed changes from a high rotation speed to a low rotation speed. For example, the threshold value N1a is larger than the threshold value N1b (N1a>N1b). Further, the difference between the threshold value N1a and the threshold value N1b is, for example, about several hundreds of rotations. Accordingly, even when the rotation speed of the motor 210 vibrates between the threshold value N1a and the threshold value N1b, it is possible to prevent frequent switching of the energization method. The other threshold values N2 to N4 also have hysteresis characteristics.

Further, in the present embodiment, the energization method switching portion 14 drives the motor 210 by the 120-degree energization method at the start-up of the motor 210 (during the start mode). The energization method switching portion 14 switches the energization method such that the motor 210 is driven by the 120-degrees energization method when the rotation speed of the motor 210 measured by the rotation speed measurement portion 13 is less than or equal to a predetermined threshold value during the steady driving of the motor 210 (during the steady mode), and the motor 210 is driven by the 150-degree energization method when the rotation speed of the motor 210 exceeds a predetermined threshold value. The start-up of the motor 210 means at the time of initiating start-up from the state in which the motor 210 is stopped. Further, the steady driving of the motor 210 means a period during which the motor 210 is stably (steadily) driven after the motor 210 is started. Further, during the steady driving, the induced voltage is sufficiently generated at the terminal of each phase, and the rotation position of the motor 210 (rotor) can be measured.

Further, in the present embodiment, the motor controller 100 includes the frequency switching portion 15. When the motor 210 is driven by the 120-degree energization method, the frequency switching portion 15 drives the motor 210 by a PWM signal having a first frequency. Further, when the motor 210 is driven by the 150-degree energization method, the frequency switching portion 15 switches the frequency so that the motor 210 is driven by the PWM signal having a second frequency that is higher than the first frequency. For example, the first frequency is 17 kHz and the second frequency is 21 kHz. That is, the second frequency is approximately 20% higher than the first frequency. By increasing the frequency of the PWM signal, the number of times the rotation position of the motor 210 is acquired increases. As a result, in the 150-degree energization method in which the frequency of the PWM signal is large, it is possible to increase the rotation speed of the motor 210 as compared with the 120-degree energization method.

Further, in the present embodiment, the frequency switching portion 15 switches the frequency of the PWM signal at the same time when the energization method switching portion 14 switches the energization method of the motor 210. That is, the energization method is switched from the 120-degree energization method to the 150-degree energization method, and at the same time, the frequency of the PWM signal is switched from the first frequency to the second frequency. Further, the frequency of the PWM signal is switched from the second frequency to the first frequency at the same time when the energization method is switched from the 150-degree energization method to the 120-degree energization method.

Further, in the present embodiment, the motor controller 100 is provided (incorporated) with three or more frequencies in a selectable manner as the frequency of the PWM signal. The first frequency and the second frequency are selected in advance from the three or more frequencies when the motor controller 100 is shipped. For example, similarly to the predetermined threshold value mentioned above, the selected first frequency and second frequency are written in the one-time memory when the motor controller 100 is shipped.

The power supply voltage correction portion 11, the PWM duty calculation portion 12, the rotation speed measurement portion 13, the energization method switching portion 14, and the frequency switching portion 15 are provided in the control portion 10 (IC) provided in the motor controller 100.

Figure 4:
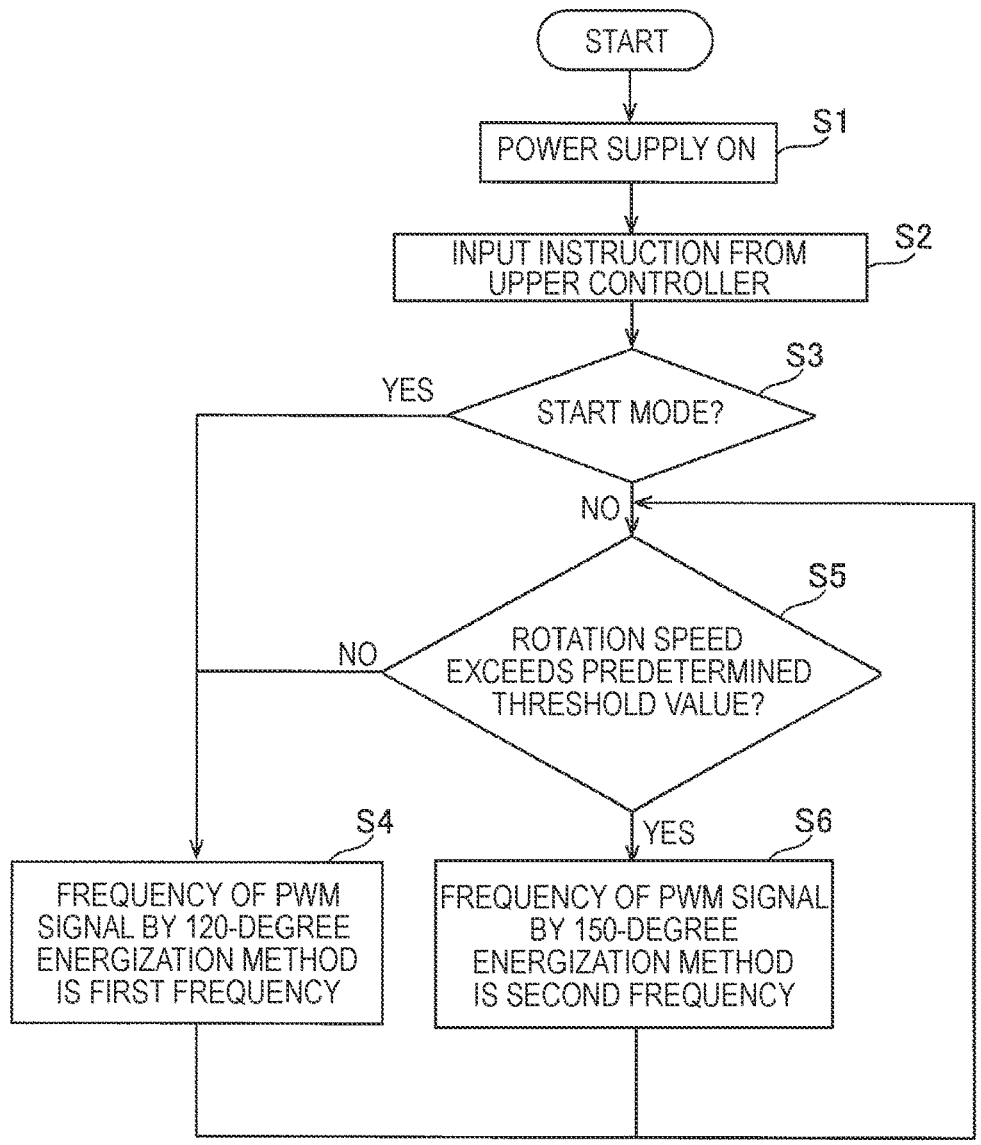
FIG. 4 is a flowchart for explaining control of the motor controller according to the embodiment disclosed here.

Next, the operation of the motor controller 100 will be described with reference to FIG. 4.

First, in a step S1, a power supply is turned on. When the motor controller 100 is mounted in a vehicle (automobile), the ignition power supply of the vehicle is turned on.

Next, in a step S2, an input signal from the upper controller 1 is input to the motor controller 100. Specifically, the upper controller 1 inputs an input signal for starting the motor 210 to the motor controller 100.

Next, in a step S3, it is determined whether or not the motor 210 is started (is in the start mode). When it is determined as yes in the step S3 based on the input signal to the motor controller 100, the motor 210 is started in a step S4. Here, at the start-up of the motor 210, the motor 210 is driven by the 120-degree energization method. Further, the frequency of the PWM signal for driving the motor is the first frequency. The process returns to the step S3.

Further, when it is determined as no in the step S3 (that is, when in the steady mode), the process proceeds to a step S5. In the step S5, it is determined whether or not the rotation speed of the motor 210 exceeds a predetermined threshold value. When it is determined as no in the step S5, the process proceeds to the step S4. That is, in the step S5, when the motor 210 is driven by the 120-degree energization method, the drive of the motor 210 by the 120-degree energization method (drive by the PWM signal having the first frequency) is continued. In the step S5, when the motor 210 is driven by the 150-degree energization method, the energization method is switched to the 120-degree energization method. Further, the frequency of the PWM signal is switched to the first frequency.

When it is determined as yes in the step S5, the process proceeds to a step S6. That is, in the step S5, when the motor 210 is driven by the 150-degree energization method, the drive of the motor 210 by the 150-degree energization method (drive by the PWM signal having the second frequency) is continued. In the step S5, when the motor 210 is driven by the 120-degree energization method, the energization method is switched to the 150-degree energization method. Further, the frequency of the PWM signal is switched to the second frequency.

The operations of above steps S4 to S6 are repeated until the power supply is turned off (between the steady modes).

Effect of the Present Embodiment

In the present embodiment, the following effects can be obtained.

In the present embodiment, as described above, when the rotation speed of the motor 210 measured by the rotation speed measurement portion 13 is less than or equal to a predetermined threshold value, it is possible to reduce the risk of step-out and to realize quietness by driving the motor 210 by the 120-degree energization method. Further, when the rotation speed of the motor 210 measured by the rotation speed measurement portion 13 exceeds a predetermined threshold value, the motor 210 is driven by the 150-degree energization method, so that the energization time for the motor 210 is long, and thus the rotation speed of the motor 210 can be increased. Further, the 150-degree energization method has the drive waveform which is closer to a sine wave (a pseudo sine wave) compared to the 120-degree energization method, and thus is superior in quietness and vibration. Further, unlike the 180-degree energization method, the 120-degree energization method and the 150-degree energization method do not always need to accurately measure the rotation speed of the rotor and the position of the rotor, and do not require an amplifier for amplifying the current. As a result, it is possible to reduce the risk of step-out in the low rotation range and to improve the quietness and the vibration in the high rotation range while suppressing the control and the configuration from becoming complicated.

Further, in the present embodiment, as described above, since it is possible to select a predetermined threshold value suitable for the specifications of the motor 210, it is possible to more reliably reduce the risk of step-out in the low rotation range and to improve the quietness and vibration in the high rotation range.

Further, in the present embodiment, as described above, since the predetermined threshold value is set such that the threshold value when the rotation speed of the motor 210 measured by the rotation speed measurement portion 13 changes from a low rotation speed to a high rotation speed, is different from the threshold value when the rotation speed of the motor 210 changes from a high rotation speed to a low rotation speed, the operation of the motor 210 is prevented from becoming unstable even when the rotation speed of the motor 210 vibrates.

Further, in the present embodiment, as described above, since at the start-up of the motor 210, the motor 210 is driven by the 120-degree energization method, it is possible to suppress an increase in the risk of step-out in the low rotation range including the start-up of the motor 210 and to improve the quietness.

Further, in the present embodiment, as described above, in the low rotation range such as at the start-up, when the 120-degree energization method is used for driving, the motor 210 is driven by the PWM signal having the relatively small first frequency, so that it is possible to reduce the loss of the motor 210 due to the heat generation of the motor 210 since the time during which the current is not supplied to the motor 210 (OFF time) is large. Further, when the 150-degree energization method is used, the pulse number of the PWM signal is increased by driving the motor 210 with the PWM signal having the second frequency higher than the first frequency, so that the rotation speed of the rotor can be increased (the control range of the rotation speed is increased).

Further, in the present embodiment, as described above, since the frequency of the PWM signal is switched at the same time when the energization method switching portion 14 switches the energization method of the motor 210, it is possible to reduce the loss of the motor 210 due to heat generation of the motor 210 and increase the control range of the rotation speed at the same time when the energization method is switched.

Further, in the present embodiment, as described above, since the predetermined threshold value is selected in advance at the time of shipment of the motor controller 100, the user of the motor controller 100 can save labor.

Further, in the present embodiment, as described above, since the first frequency and the second frequency are selected in advance from the three or more frequencies when the motor controller 100 is shipped, the motor 210 can be controlled based on the first frequency and the second frequency that are appropriately selected according to the specifications of the motor 210 or the like.

Modification Example

It should be considered that the embodiment disclosed this time are to be considered as illustrative in all points and not restrictive. The scope disclosed here is illustrated not by the embodiment described above but by the scope of the claims, and further includes meanings equivalent to the scope of the claims and all modifications (modification example) within the scope.

For example, in the embodiment described above, an example in which a plurality of predetermined threshold values are provided in a selectable manner is illustrated, but this disclosure is not limited to this. For example, when the appropriate predetermined threshold value does not change depending on the specifications of the motor, only one predetermined threshold value may be provided.

Further, in the embodiment described above, an example in which four predetermined threshold values are provided in a selectable manner is illustrated, but this disclosure is not limited to this. In this disclosure, the predetermined threshold value may be provided in a number other than four.

Further, in the embodiment described above, an example in which the predetermined threshold value has a hysteresis property is illustrated, but this disclosure is not limited to this. For example, the predetermined threshold value may not have the hysteresis property when the variation in the rotation speed is relatively small.

Figure 5:
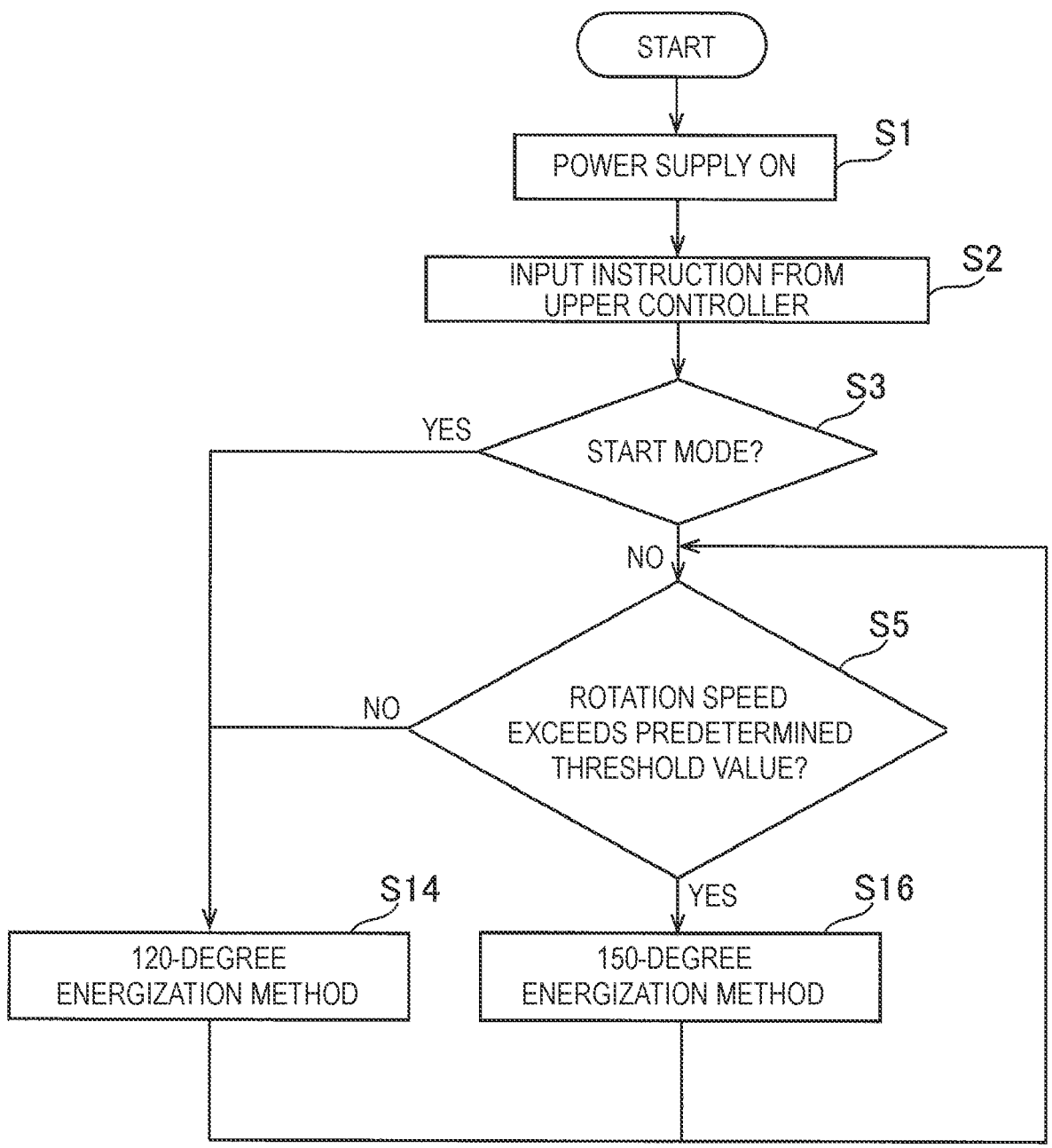
FIG. 5 is a flowchart explaining control of a motor controller according to a modification example.

Further, in the embodiment described above, an example is illustrated in which the frequency of the PWM signal is different between when the motor is driven by the 120-degree energization method and when the motor is driven by the 150-degree energization method, but this disclosure is not limited to this. For example, similar to the motor controller according to the modification example illustrated in FIG. 5, in steps S14 and S16, it may be configured such that only the energization method may be switched without switching the frequency of the PWM signal.

Further, in the embodiment described above, an example in which three or more frequencies are provided in a selectable manner as the frequency of the PWM signal is illustrated, but this disclosure is not limited to this. For example, two frequencies may be provided as long as the appropriate frequency does not change depending on the specifications of the motor.

Further, in the embodiment described above, the example in which the motor controller is mounted on the vehicle is illustrated, but this disclosure is not limited to this. This disclosure can also be applied to a motor controller mounted on an apparatus other than a vehicle.

Further, in the embodiment described above, the example in which the motor controller is configured to control the drive of the electric water pump is illustrated, but this disclosure is not limited to this. This disclosure can also be applied to a motor controller that controls the drive of a pump (oil pump or the like) other than the electric water pump.

A motor controller according to one aspect of the present disclosure includes a rotation speed measurement portion that measures a rotation speed of a motor; and an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value.

The motor controller according to one aspect of the present disclosure, as described above, includes an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value. When the motor is driven by the 150-degree energization method in the low rotation range, excessive electric power is supplied to the motor, so that the rotation speed becomes unstable. Accordingly, the risk of step-out of the motor increases and the noise also increases. Further, in the low rotation range, the risk of step-out may increase due to the disturbance. Accordingly, as described above, when the rotation speed of the motor measured by the rotation speed measurement portion is less than or equal to a predetermined threshold value, it is possible to reduce the risk of step-out and to realize quietness by driving the motor by the 120-degree energization method. Further, since the 150-degree energization method has a longer energization time to the motor than the 120-degree energization method, the rotation speed of the motor can be increased. Further, the 150-degree energization method has the drive waveform which is closer to a sine wave (a pseudo sine wave) compared to the 120-degree energization method, and thus is superior in quietness and vibration. Further, unlike the 180-degree energization method, the 120-degree energization method and the 150-degree energization method do not always need to accurately measure the rotation speed of the rotor and the position of the rotor, and do not require an amplifier for amplifying the current. As a result, it is possible to reduce the risk of step-out in the low rotation range and to improve the quietness and the vibration in the high rotation range while suppressing the control and the configuration from becoming complicated.

In the motor controller according to the above aspect, it is preferable that a plurality of predetermined threshold values are provided in a selectable manner and the predetermined threshold is selected in advance before the control of the motor is started.

Here, the predetermined threshold value for switching between the 120-degree energization method and the 150-degree energization method varies depending on the specifications of the motor (motor type and magnetic flux amount). Accordingly, by configuring as described above, since it is possible to select a predetermined threshold value suitable for the specifications of the motor, it is possible to more reliably reduce the risk of step-out in the low rotation range and to improve the quietness and vibration in the high rotation range.

In the motor controller according to the above aspect, it is preferable that the predetermined threshold value is set such that a threshold value when the rotation speed of the motor measured by the rotation speed measurement portion changes from a low rotation speed to a high rotation speed is different from a threshold value when the rotation speed of the motor changes from the high rotation speed to the low rotation speed.

Here, when the predetermined threshold value is the same in a case where the rotation speed of the motor changes from a low rotation speed to a high rotation speed and in a case where the rotation speed of the motor changes from a high rotation speed to a low rotation speed, switching between the 120-degree energization method and the 150-degree energization method is frequently repeated when the rotation speed of the motor vibrates. Accordingly, the operation of the motor becomes unstable. Accordingly, by configuring as described above, it is possible to prevent the operation of the motor from becoming unstable even when the rotation speed of the motor vibrates.

In the motor controller according to the above aspect, it is preferable that the energization method switching portion switches an energization method such that during start-up of the motor, the motor is driven by the 120-degree energization method, and during steady driving of the motor, the motor is driven by the 120-degree energization method when the rotation speed of the motor measured by the rotation speed measurement portion is less than or equal to the predetermined threshold value and the motor is driven by the 150-degree energization method when the rotation speed of the motor exceeds the predetermined threshold value.

According to this configuration, when the motor is driven by the 150-degree energization method in the low rotation range including the start-up of the motor, the electric power is excessively supplied to the motor and the rotation speed of the motor becomes unstable. Accordingly, the risk of step-out increases and the noise increases. Accordingly, with the configuration as described above, it is possible to suppress an increase in the risk of step-out in the low rotation range including the start-up of the motor, and to improve quietness.

It is preferable that the motor controller according to the above aspect further includes a frequency switching portion that switches a frequency so that the motor is driven by a PWM signal having a first frequency when the motor is driven by the 120-degree energization method, and the motor is driven by a PWM signal having a second frequency higher than the first frequency when the motor is driven by the 150-degree energization method.

Here, in the low rotation range such as at the start-up, since the current supplied to the motor becomes excessively large, heat generation of the motor becomes large. Accordingly, in the low rotation range such as at the start-up, when the 120-degree energization method is used for driving, the motor is driven by the PWM signal having the relatively small first frequency, so that it is possible to reduce the loss of the motor due to the heat generation of the motor since the time during which the current is not supplied to the motor (OFF time) is large. Further, in the 150-degree energization method, the time for measuring the rotation position of the rotor is between 30 degrees in phase. That is, the time (electric power time) for measuring the rotation position of the rotor and increasing the rotation speed of the rotor is short. Accordingly, when the 150-degree energization method is used, the pulse number of the PWM signal is increased by driving the motor with the PWM signal having the second frequency higher than the first frequency, so that the rotation speed of the rotor can be increased (the control range of the rotation speed is increased).

In this case, it is preferable that the frequency switching portion is configured to switch the frequency of the PWM signal at the same time when the energization method switching portion switches the energization method of the motor.

According to this configuration, it is possible to reduce the loss of the motor due to the heat generation of the motor and increase the control range of the rotation speed at the same time when the energization method is switched.

In the present application, the motor controller according to the above aspect may have the following configurations.

APPENDIX 1

That is, in the motor controller in which a plurality of the predetermined threshold values are provided in a selectable manner, the predetermined threshold values are selected in advance when the motor controller is shipped.

With this configuration, the user of the motor controller can save time and effort.

APPENDIX 2

Further, in the motor controller in which the frequency of the PWM signal is switched, three or more frequencies are provided in a selectable manner as frequencies of the PWM signal, and the first frequency and the second frequency are selected in advance among three or more frequencies at the time of shipping the motor controller.

With this configuration, the motor can be controlled based on the first frequency and the second frequency that are appropriately selected according to the specifications of the motor or the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor controller comprising:
   a rotation speed measurement portion that measures a rotation speed of a motor; and
   an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value.

2. A motor controller comprising:
   a rotation speed measurement portion that measures a rotation speed of a motor; and
   an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value, wherein
   a plurality of the predetermined threshold values are provided in a selectable manner, and the predetermined threshold is selected in advance before control of the motor is started.

3. A motor controller comprising:
   a rotation speed measurement portion that measures a rotation speed of a motor; and
   an energization method switching portion that switches an energization method so that the motor is driven by a 120-degree energization method when a rotation speed of the motor measured by the rotation speed measurement portion is less than or equal to a predetermined threshold value, and the motor is driven by a 150-degree energization method when a rotation speed of the motor measured by the rotation speed measurement portion exceeds the predetermined threshold value, wherein
   the predetermined threshold value is set such that a threshold value when the rotation speed of the motor measured by the rotation speed measurement portion changes from a low rotation speed to a high rotation speed is different from a threshold value when the rotation speed of the motor changes from the high rotation speed to the low rotation speed.

4. The motor controller according to claim 1, wherein
   the energization method switching portion switches an energization method such that during start-up of the motor, the motor is driven by the 120-degree energization method, and during steady driving of the motor, the motor is driven by the 120-degree energization method when the rotation speed of the motor measured by the rotation speed measurement portion is less than or equal to the predetermined threshold value and the motor is driven by the 150-degree energization method when the rotation speed of the motor exceeds the predetermined threshold value.

5. The motor controller according to claim 1, further comprising:
   a frequency switching portion that switches a frequency so that the motor is driven by a PWM signal having a first frequency when the motor is driven by the 120-degree energization method, and the motor is driven by a PWM signal having a second frequency higher than the first frequency when the motor is driven by the 150-degree energization method.

6. The motor controller according to claim 5, wherein
   the frequency switching portion is configured to switch the frequency of the PWM signal at the same time when the energization method switching portion switches the energization method of the motor.

* * * * *